United States Patent [19]

King, Jr. et al.

[11] Patent Number: 5,109,629
[45] Date of Patent: May 5, 1992

[54] METHOD AND APPARATUS FOR KILLING SUBTERRANEAN INSECTS

[76] Inventors: William G. King, Jr., 2017 Yorktown Ct. South, League City, Tex. 77573; W. Edward Lawrence, 2323 W. Bay Area Blvd., #901, Webster, Tex. 77598

[21] Appl. No.: 603,792

[22] Filed: Oct. 26, 1990

[51] Int. Cl.$^5$ .............................................. A01M 13/00
[52] U.S. Cl. ..................................... 43/132.1; 43/124; 239/289
[58] Field of Search ..................... 43/124, 125, 132.1, 43/138, 127; 239/289, 345, 346, 376

[56] References Cited

U.S. PATENT DOCUMENTS

| | | | |
|---|---|---|---|
| 1,492,732 | 5/1924 | Knopf | 43/124 |
| 1,872,676 | 8/1932 | Castonguay | 43/127 |
| 2,201,995 | 5/1940 | Erickson | 43/125 |
| 2,745,210 | 5/1956 | Hilo | 43/125 |
| 2,835,533 | 5/1958 | Baker | 239/346 |
| 2,865,671 | 12/1958 | Jensen | 239/289 |
| 3,017,121 | 1/1962 | Carlson | 239/289 |
| 3,589,054 | 6/1971 | Pascucci | 43/124 |
| 3,857,515 | 12/1974 | Zennie | 239/289 |
| 4,026,330 | 5/1977 | Dunn | 43/124 |
| 4,624,070 | 11/1986 | Query et al. | 43/132.1 |
| 4,829,706 | 5/1989 | Perry | 43/127 |

Primary Examiner—Richard K. Seidel
Assistant Examiner—Jeanne M. Elpel
Attorney, Agent, or Firm—Dodge, Bush, Moseley & Riddle

[57] ABSTRACT

A system (10) and method for killing ants in a subterranean colony (102) is disclosed. Liquid insecticide is vaporized in a fogging a vaporization chamber (23) by the exhaust of an internal combustion engine (14) such as that mounted on a lawn mower (12) or farm tractor. An insertion probe (30) having exhaust holes (36) is connected to an output of the vaporization chamber by a flexible hose (24). In operation, the probe is inserted into the subterranean colony (102), whereby vaporized insecticide is applied down in the colony. Such vaporized insecticide travels through passages to various "rooms" of the colony, thereby contacting ants in all parts of the colony.

4 Claims, 1 Drawing Sheet

U.S. Patent
May 5, 1992
5,109,629
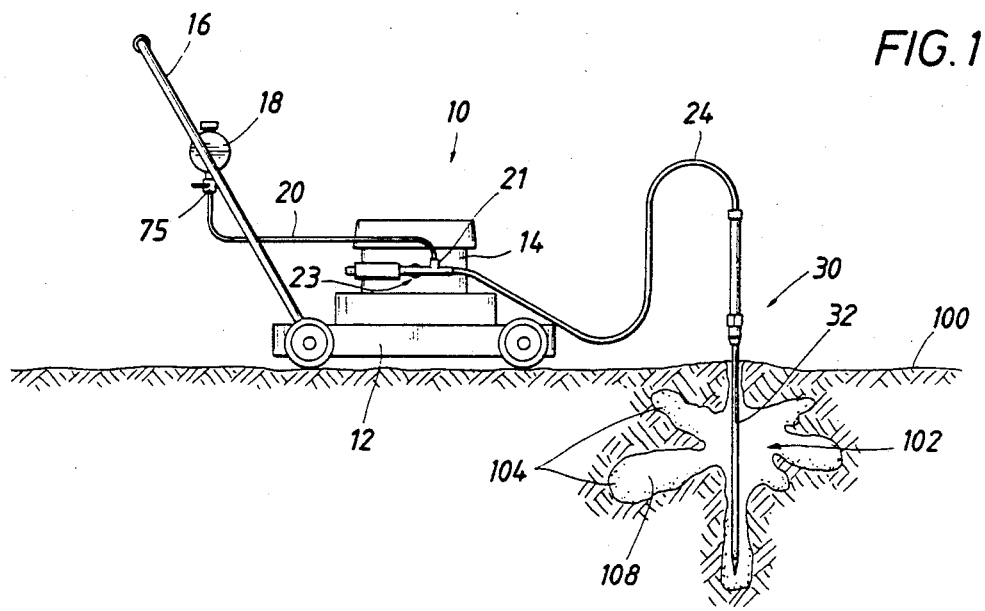
FIG. 1
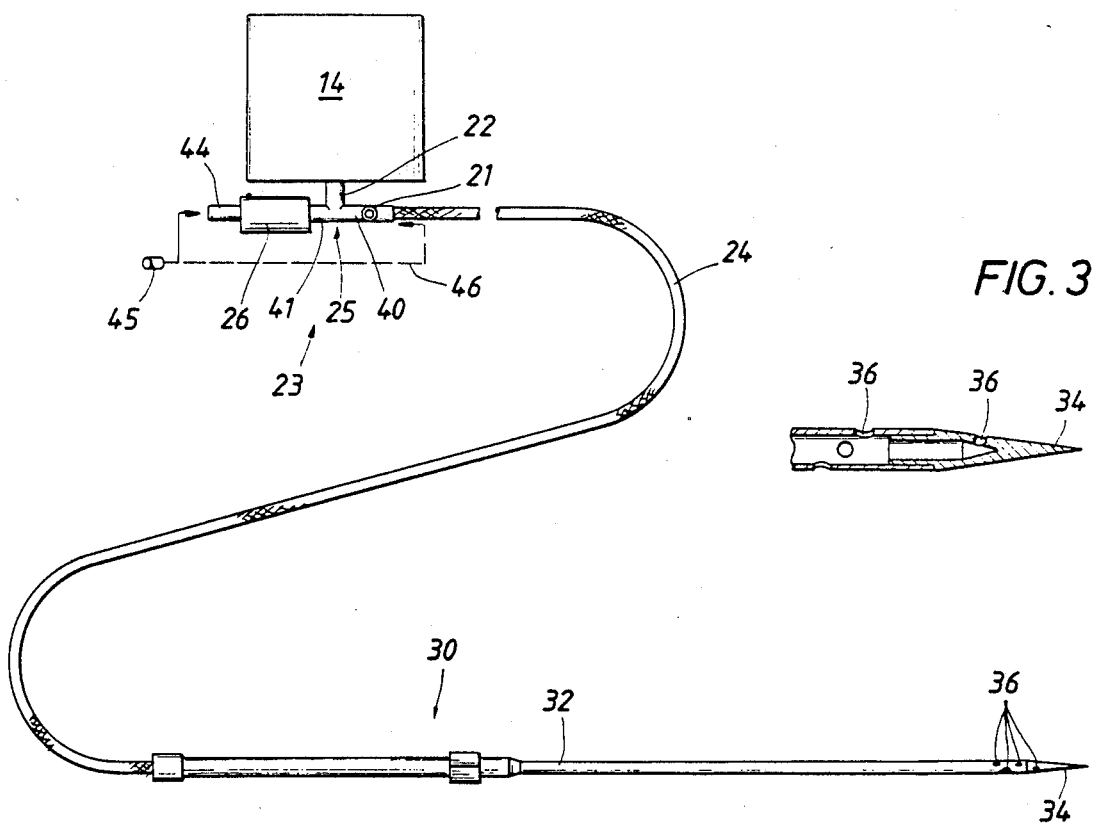
FIG. 3
FIG. 2

METHOD AND APPARATUS FOR KILLING SUBTERRANEAN INSECTS

BACKGROUND OF THE INVENTION

1. Field of the Invention

This invention relates in general to the field of killing ants, especially harvester ants and fire ants. More particularly, the invention relates to killing subterranean insects that colonize subterranean chambers interconnected by passages.

2. Description of the Prior Art

It is known to kill insects such as ants with pesticides such as Diazonon TM, Dursban TM and Malathion TM brand insecticides. Such brand names are for chemicals which have well known properties of killing insects on contact. Brand name insecticides may be purchased from lawn and garden stores in liquid form. Since such insecticides kill ants and other insects on contact, prior use of such insecticides has been to spraying insecticides in the air or to pour liquid insecticide on a surface where the ants may be present. Accordingly, it has been the practice to apply insecticides to the mound surface of a fire ant or harvester ant mound with the intention of killing as many ants on the surface and making life for the ants as miserable as possible.

Indeed, such practice does kill a great many ants, but many ants also survive deep in "rooms" of the subterranean colony. Such surviving ants simply pick up and move, leaving their former subterranean colony and building another at a distance from the first. Such ants reproduce, and in a short time another colony exists in another location with as many ants as before.

IDENTIFICATION OF OBJECTS OF THE INVENTION

Accordingly, it is a primary object of this invention to provide an inexpensive method for killing fire ants in their subterranean colony;

It is another object of the invention to provide an apparatus and a method to apply insecticide fog deep within a fire ant or harvester ant subterranean colony, whereby such fog may travel along colony passages into "rooms" where ants reside, thereby killing a substantial proportion of ants within the colony.

SUMMARY

The objects of the invention described above as well as other features and advantages are provided in a system including a source of pressurized air which vaporizes liquid insecticide in a vaporizing chamber. Vaporized insecticide is applied to the interior of the insect colony with a probe having holes disposed at its penetrating end. The probe is connected to the vaporizing chamber via a flexible hose.

In a preferred embodiment, the source of pressurized air is an internal combustion engine which exhausts its combustion components via an exhaust port. A vaporizing chamber is attached to such exhaust port. A container or tank of insecticide is attached to the machine, such as a lawn mower or farm tractor. A tube is connected between the tank and the vaporizing chamber. Insecticide is applied in liquid form via the tube to the vaporizing chamber where it is vaporized by the hot pressurized exhaust from the engine. The fog or vapor travels via the flexible hose to the probe and out the holes near the bottom of the probe. When the probe is inserted via the surface mound of the insect colony to a point deep within the colony, such fog penetrates colony passages and rooms and kills resident insects.

BRIEF DESCRIPTION OF THE DRAWINGS

The objects, advantages and features of the invention will become more apparent by reference to the drawings which are appended hereto and wherein like numerals indicate like elements and wherein an illustrative embodiment of the invention is shown, of which:

FIG. 1 is a side view of surface apparatus which illustrates a fogging probe of the invention inserted deep within an insect colony;

FIG. 2 is a plan view of the apparatus illustrating a preferred vaporizing chamber connected to the output exhaust port of an internal combustion engine; chamber; and FIG. 3 is a cross section of the penetrating end of the fogging probe of the apparatus showing holes which communicate with its interior.

DESCRIPTION OF THE INVENTION

Fire and harvester ants are increasingly becoming a problem in rural and urban areas of the United States and other countries. In rural areas, such insects take up residence in pastures and fields in increasing numbers in subterranean colonies. These ant subterranean "hotels" include a central passage to the surface of the mound and many underground "rooms" or chambers interconnected by other passages. Prior attempts at flooding, burning, and spraying liquid insecticides on such insect mounds have not been effective. Prior art attempts at killing such ants have failed because there has been no effective, inexpensive apparatus and method for killing ants deep within the subterranean colony.

The apparatus 10 of FIG. 1 is adapted to provide a probe 30 for applying vaporized fog into a subterranean colony or "mound" 102 beneath the earth's surface 100. FIG. 1 illustrates a common residential lawn mower 12 having an internal combustion engine, that is, lawn mower engine 14. It should be emphasized that this invention merely requires a source of pressurized air to vaporize liquid insecticide in a vaporizing chamber. Preferably, the pressurized air is hot, as from the exhaust of an internal combustion engine, but the source of pressurized air may also be an air compressor, or the like.

In the preferred embodiment of the invention as illustrated in FIG. 1, a tank 18 containing liquid insecticide is secured to the lawn mower handle 16. A tube 20 is connected from the bottom of tank 18 to vaporizing chamber 23. A flexible hose 24 is connected between the output of vaporizing chamber 23 and probe 30 which is adapted for insertion deep within the mound 102. Probe 30 is preferably fabricated of metal.

FIG. 2 shows the preferred embodiment of vaporizing chamber 23, especially adapted for use when chamber 23 is connected to an exhaust port of engine 14. In such preferred embodiment, vaporizing chamber 23 takes the form of a "T" pipe, with its base 22 secured, as by threading, to the exhaust port of engine 14. To one arm 40 of cross member 25, a connector 21 connects the end of tube 20 to the interior of arm 40. To the other end 41 of cross member 25 an exhaust muffler 26 is attached. A plug 45 is adapted to be secured either to the end or stub 44 of muffler 26 or to the end of arm 40 as indicated by dotted line 46.

When the apparatus of FIGS. 1 and 2 is connected for fogging subterranean insects, plug 45 is secured to stub 44 to prevent substantial exhaust via muffler 26. In that connection, liquid insecticide enters cross member 25 via tube input 21 and is vaporized by the hot pressurized exhaust from base member 22 and engine 14. Such vaporized insecticide or fog travels along flexible hose 24 which is connected to the end of arm 40. Vaporized insecticide is prevented from exiting via muffler 26 in arm 41 because plug 45 is connected to muffler output stub 44.

Vaporized insecticide is forced by the pressure of the exhaust of engine 14 to probe 30 which is secured to the end of flexible hose 24. A tube 32 is terminated by a conical or pointed end section 34 which aids a human operator to insert probe 30 into mound 102. A plurality of holes 36 are provided in tube 32 and in conical section 34 where vaporized insecticide exits deep within a subterranean colony.

An alternative embodiment of the invention includes a vaporizing chamber comprising a straight tube which may be screwed directly into an exhaust port of the internal combustion engine of a lawn mower, farm tractor or the like. Tube 20 may be secured into the wall of the straight tube vaporizing chamber. Flexible hose 24 may be secured to the outlet end of the straight tube vaporizing chamber.

In the preferred embodiment or the alternating embodiment as described above, valve 75 in tube 20 may be used to adjust the amount of liquid insecticide flowing to the vaporization chamber. The fogging or vaporization output can thereby be controlled.

METHOD OF OPERATION FOR KILLING ANTS

The apparatus described above is especially adapted for killing fire or harvester ants. Harvester ants live in arid environments and depend almost totally on seeds. Most harvesters construct elaborate subterranean nests or colonies which reach depths of six feet or more. The nests contain some chambers devoted entirely to the storage of seeds and are sometimes topped by a mound of gravel and sand. Workers clear all vegetation from a circular space around the nest some 3 to 33 feet wide. Harvester ants generally husk the collected seeds before storing them.

The method of the invention includes attaching plug 45 to stub 44 of muffler 26 and attaching flexible hose 24 to the end of arm 40 of cross member 25 as illustrated in FIG. 2. The probe 30 is inserted into ant colony 102. Valve 75 in tube 20 is opened to allow liquid insecticide from tank 18 to flow to vaporization chamber 23 via connector 21. The insecticide is vaporized and is forced along flexible hose 24 and out holes 36 of tube 32 inserted within colony 102 by the pressurized exhaust output of engine 14. The liquid insecticide is preferably a 5% by volume solution of Diazinone TM, Malathion TM or Dursban TM. The fog via holes 36 fills all chambers, such as 104, 108 of colony 102 and coats all surfaces of same including ants, eggs, larva, etc. When fogging is not to be performed, valve 22 is closed, and plug 45 is inserted at the outlet of vaporization chamber 23. In other words, plug 45 is removed from the stub 44 of muffler 26 and secured within the end of arm 40 of chamber 23.

Various modifications and alterations in the described methods and apparatus will be apparent to those skilled in the art of the foregoing description which do not depart from the spirit of the invention. For this reason, such changes are desired to be included in the appended claims. The appended claims recite the only limitation to the present invention. The descriptive manner which is employed for setting forth the embodiments should be interpreted as illustrative but not limitative.

What is claimed is:

1. A system (10) for applying vaporized insecticide to a subterranean ant colony (102) comprising,
    a machine (12) including an internal combustion engine (14) having an exhaust port,
    a tank (18) mounted on said machine (12) for holding liquid insecticide,
    a T-pipe (25) having a base member (22) and a cross member (40, 41) in communication with said base member, said cross member having first (40) and second (41) arms in communication with said base member which is connected to said exhaust port,
    a tube (20) connected from said tank (18) to a first arm (40) of said cross member of said T-pipe (25), said tube (20) adapted to conduct liquid insecticide from said tank (18) to the interior of said first arm (40),
    a metallic tubular probe (30) having an insertion end (34) adapted for insertion into said subterranean ant colony (102) and having a plurality of holes (36) formed therein in a region near its insertion end, said probe having a connection end,
    a flexible hose (24) connected at one end to said connection end of said tubular probe (30) and adapted for removable connection at its other end to said first arm (40) of said T-pipe (25),
    a muffler (26) connected to said second arm (41) of said cross member of said T-pipe (25), and
    means (45) for removably plugging said first arm (40) of said T-pipe (25) when said flexible hose is (24) not connected thereto and for removably plugging said muffler (26) when said flexible hose (24) is connected to said first arm of said T-pipe.

2. The system of claim 1 further comprising means (22) for manually opening or closing said tube (20) thereby allowing or preventing flow of liquid insecticide from said tank (18) to said first arm (40) of said T-pipe (25).

3. Apparatus for applying vaporized insecticide to a subterranean ant colony (102) comprising,
    a powered machine (12) including an internal combustion engine (14) having an exhaust port through which hot exhaust products are emitted,
    a T-shaped pipe having its base (22) removably secured to said port of said engine, said T-shaped pipe having a cross member formed with said base, said cross member having two sides (40, 41) branching from said base,
    one of said sides (40) of said cross member having an insecticide inlet port (21) and an outlet port, the other of said sides (41) of said cross member including an exhaust muffler (26) attached thereto
    tank means (18) attached to said machine (12) for holding a quantity of liquid insecticide,
    insecticide tube means (20) connected between said tank means (18) and said insecticide port (21) for transferring liquid insecticide from said tank means (18) to said one side (40) of said cross member of said T-shaped pipe,
    a tubular probe (30) having an insertion end (34) and a connection end, said probe (30) having holes (36) formed in its wall near said insertion end (34), and a flexible hose (24) connected between said connection end of said tubular probe (30) and said outlet port of said one side of said cross members of said T-shaped pipe.

4. A method of killing insects in a subterranean colony comprising the steps of,
providing a T-shaped pipe with a base and a cross member, said cross member having first and second sides,
attaching said base of said T-shaped pipe to an exhaust outlet of a power mower,
attaching a muffler to one of said sides of said cross member,
flowing liquid insecticide from a tank via a tube into the other of said sides of said cross member whereby said liquid insecticide is vaporized by the exhaust of said power mower via said base and said other of said sides of said cross member,
conducting vaporized insecticide from said other of said sides of said cross member to a probe having holes disposed in its wall at an insertion end, and
inserting said probe into said subterranean colony thereby applying vaporized insecticide into said colony for communication through passages of said colony.

* * * * *